April 21, 1925.
H. H. BOSTICK
1,534,762
ADJUSTABLE END THRUST FOR ELEVATOR SHAFTS
Filed April 19, 1924
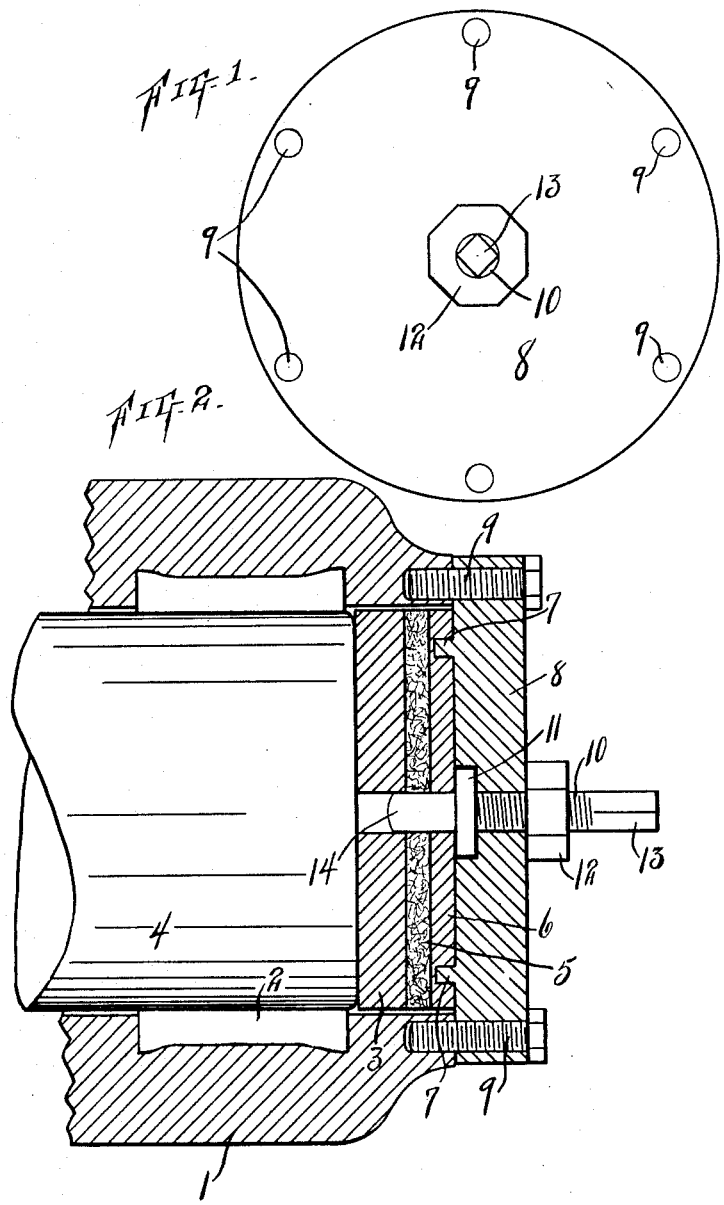
Inventor
HEYWOOD H BOSTICK
By A. L. Jackson
Attorney Patented Apr. 21, 1925.

1,534,762

UNITED STATES PATENT OFFICE.

HEYWOOD H. BOSTICK, OF FORT WORTH, TEXAS, ASSIGNOR TO GLOBE ELEVATOR APPLIANCE COMPANY, OF FORT WORTH, TEXAS, A CORPORATION OF DELAWARE.

ADJUSTABLE END THRUST FOR ELEVATOR SHAFTS.

Application filed April 19, 1924. Serial No. 707,615.

*To all whom it may concern:*

Be it known that I, HEYWOOD H. BOSTICK, a citizen of the United States, residing at Fort Worth, in the county of Tarrant and State of Texas, have invented certain new and useful Improvements in Adjustable End Thrusts for Elevator Shafts, of which the following is a specification.

My invention relates to thrust bearings and more particularly to thrust bearings in combination with the brake wheel shaft of elevators; and the object is to provide a simple device for taking up the slack of or wear on the shoulders of the brake wheel shaft. In the present practice, the only way the trouble of the hammering of the shaft and the shifting of the shaft are prevented is to stop the elevator and to take off the head and turn an annular shoulder on the head so that the head will project far enough within the bearing to force the shaft axially to prevent the hammering or knocking. The adjustment has to be repeated as soon as there is more wear on the shoulders of the shaft. With the improved device, it is not necessary to remove the head at all. The adjustment is accomplished by loosening one nut and tightening up a thrust bolt. Other objects and advantages will be fully explained in the following description and the invention will be more particularly pointed out in the claims.

Reference is had to the accompanying drawings which form a part of this application.

Fig. 1 is an end elevation of the head which covers the end of the shaft. Fig. 2 is a vertical section of the bearing and the adjusting devices.

Similar characters of reference are used to indicate the same parts throughout the several views.

The bearing 1 is provided with the usual lubricating cavity 2. A case-hardened steel disk 3 limits the axial movement of the shaft 4. This disk 3 is movable within the bearing 1. A fibre disk 5 bears against the disk 3. A disk 6 of case hardened steel bears against the disk 5. All these disks are movable within the end of the bearing. The disk 6 has cavities in the outer face for the lugs 7 which are integral with the head 8. The head 8 is bolted rigidly to the end of the bearing 1 by bolts 9. The head 8 has a central opening which is screw threaded for a thrust bolt 10. The disks 3, 5, and 6 have openings for the bolt 10 which moves freely therein. A collar or thrust washer 11 is rigidly mounted on the bolt 10 and bears against the disk 6. The collar 11 holds the three disks 3, 5, and 6 against movement axially. If the shoulders on the shaft 4 become worn, the nut 12 is loosened. The bolt 10 can then be screwed up to push the collar 11 against the disk 6 and so thrust the disks 3, 5, and 6 inwardly towards the end of the shaft 4. The lugs 7 on the head 8 prevent the disk 6 from turning. The bolt 10 may have a square portion 13 for convenience in screwing up the bolt. That part 14 of the bolt 10 which projects beyond the collar 11 is smooth so that it will not interfere with the disks 3, 5, and 6.

With the improvements set forth, the adjusting of the shaft movement may be accomplished in a few minutes without taking the head 8 off and without stopping the elevator. The wear of the shoulders on the shaft 4 causes a shifting of the brake wheel which must be remedied as soon as possible.

What I claim, is,—

1. The combination with an elevator shaft and bearings therefor, of an end thrust for said shaft consisting of a disk provided with a central perforation, a fibre disk provided with a perforation and bearing against said disk, a non-rotatable perforated steel disk bearing against said fibre disk, a perforated cap attached to said bearings, a pressure bolt projected through said cap and disks and provided with a collar rigid therewith to bear against said steel disk, and means for adjusting said bolt for moving said disks to take up wear.

2. In an elevator shaft provided with bearings and a perforated cap for said bearings rigid therewith; an end thrust for said shaft comprising a disk provided with a central perforation and bearing against the end of said shaft, a disk of yielding material provided with a central perforation bearing against said disk, a perforated disk of hardened material bearing against said yielding disk, and having cavities in its outer surface, a perforated cap bolted to said bearings and provided with lugs projecting into said cavities, a thrust bolt provided with a collar rigid therewith and bearing against said hardened disk, and means for adjusting said bolt to move said disks to take up wear of disks and shaft.

3. In an elevator shaft provided with bearings and a perforated cap for said bearings rigid therewith; an end thrust for said shaft comprising a disk provided with a central perforation and bearing against the end of said shaft, a centrally perforated disk of yielding material bearing against said disk, a perforated disk of hardened material bearing against said yielding disk and provided with cavities in its outer face, said cap having lugs projecting into said cavities and having the perforation therein threaded, a thrust bolt having a smooth portion projecting through said disks and a threaded portion for engaging said cap and having a collar rigid therewith and bearing against said hardened disk, and a lock-nut for said bolt.

In testimony whereof, I set my hand, this 22d day of March, 1924.

HEYWOOD H. BOSTICK.